No. 11,748. Reissued June 13, 1899.

J. K. PROCTOR.

MACHINE FOR TREATING TOBACCO.

(Application filed May 10, 1899.)

3 Sheets—Sheet 1.

No. 11,748. Reissued June 13, 1899.

J. K. PROCTOR.

MACHINE FOR TREATING TOBACCO.

(Application filed May 10, 1899.)

3 Sheets—Sheet 2.

Witnesses:
Robert S. Blake
James E. Krayer.

Inventor:-
Josiah K. Proctor,
by his Attorneys:- Howson & Howson

No. 11,748. Reissued June 13, 1899.

J. K. PROCTOR.

MACHINE FOR TREATING TOBACCO.

(Application filed May 10, 1899.)

3 Sheets—Sheet 3.

Witnesses:—
Robert S. Blake
James C. Krayer.

Inventor:—
Josiah K. Proctor,
by his Attorneys,
Howson & Howson

UNITED STATES PATENT OFFICE.

JOSIAH K. PROCTOR, OF PHILADELPHIA, PENNSYLVANIA, ASSIGNOR TO THE PHILADELPHIA TEXTILE MACHINERY COMPANY, OF SAME PLACE.

MACHINE FOR TREATING TOBACCO.

SPECIFICATION forming part of Reissued Letters Patent No. 11,748, dated June 13, 1899.

Original No. 622,976, dated April 11, 1899. Application for reissue filed May 10, 1899. Serial No. 716,317.

*To all whom it may concern:*

Be it known that I, JOSIAH K. PROCTOR, a citizen of the United States, residing in Philadelphia, Pennsylvania, have invented certain Improvements in Machines for Treating Tobacco, of which the following is a specification.

The object of my invention is to take tobacco as it is purchased from the farmer and so treat and cure it as to remove objectionable juices and thoroughly dry it and then to restore it to the keeping order for prizing by one continuous operation. This object I attain in the following manner, reference being had to the accompanying drawings, in which—

Figure 1:
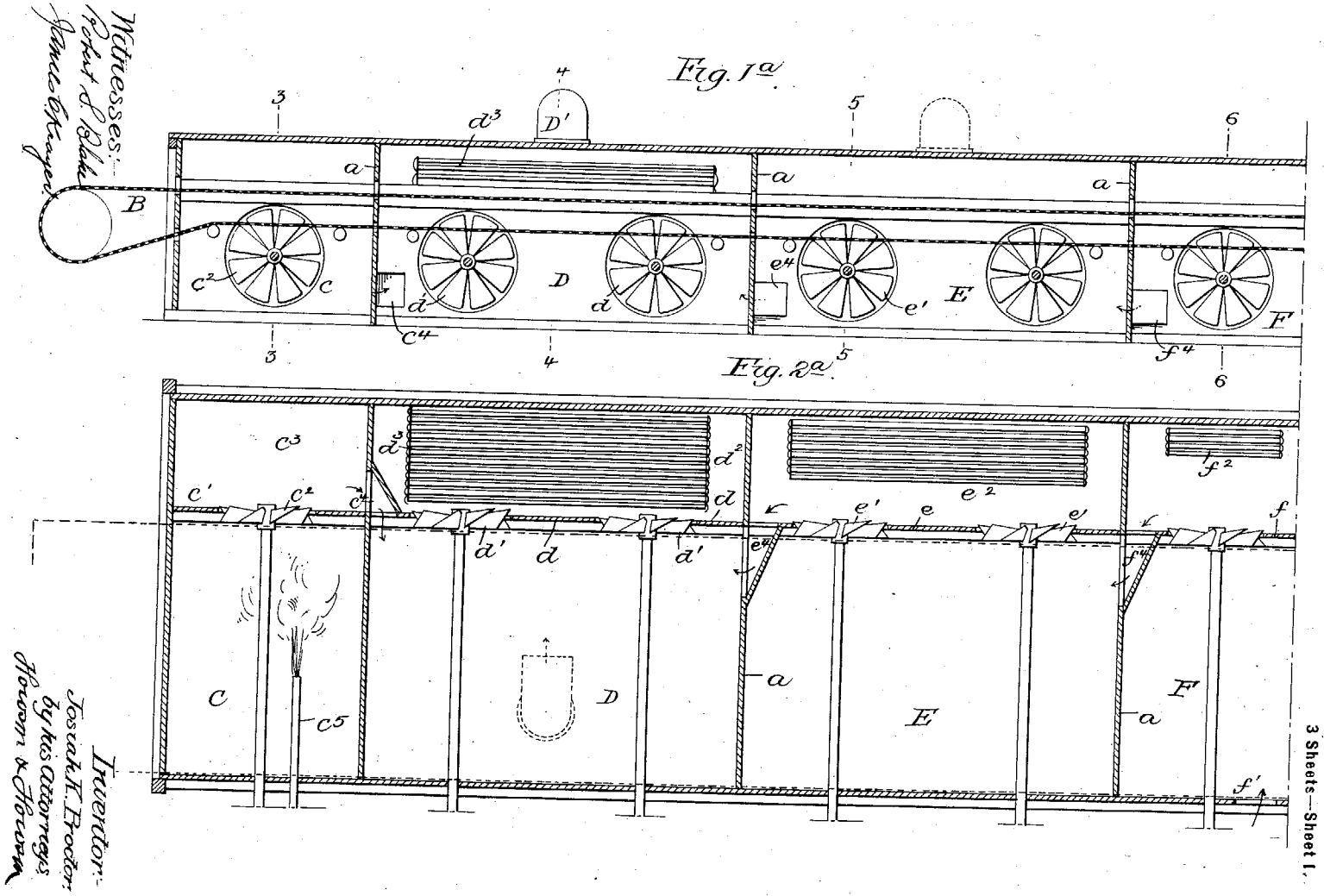
Figure 2:
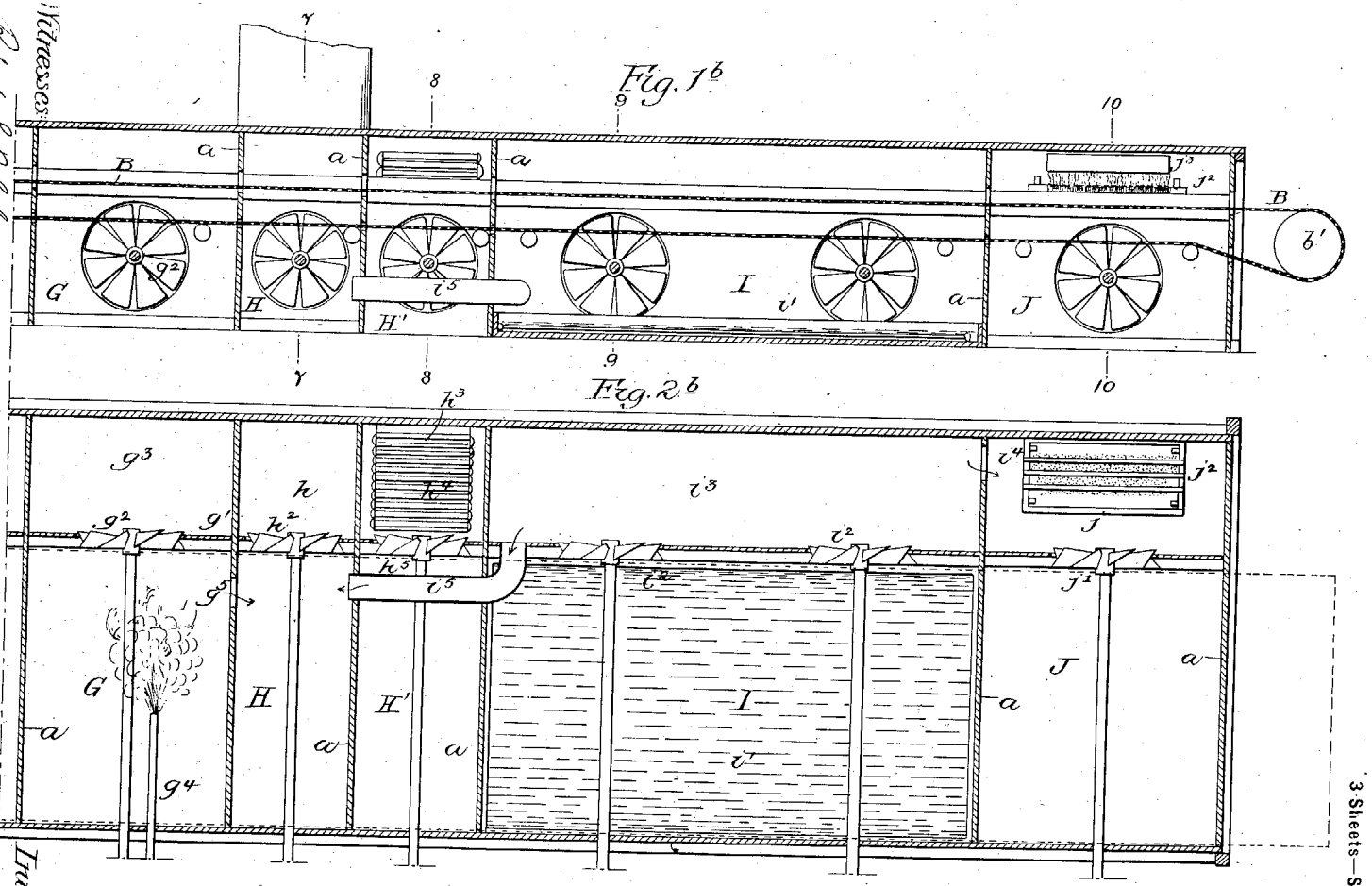
Figure 3:
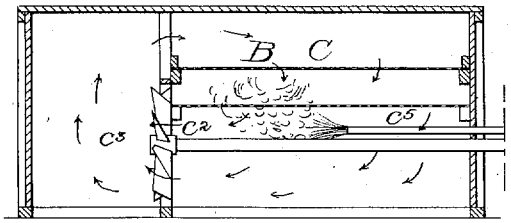
Figure 4:
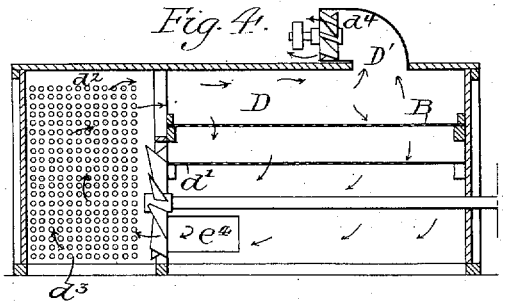
Figure 5:
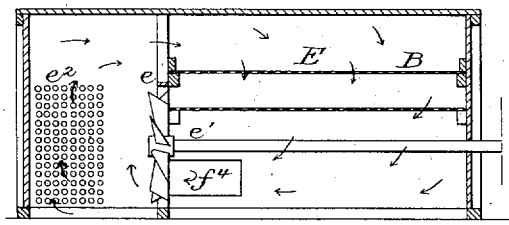
Figure 6:
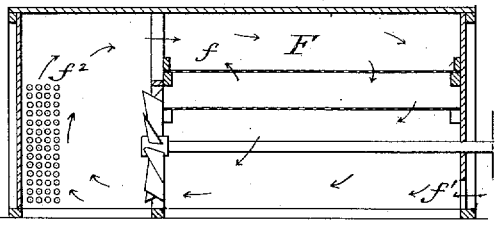
Figure 7:
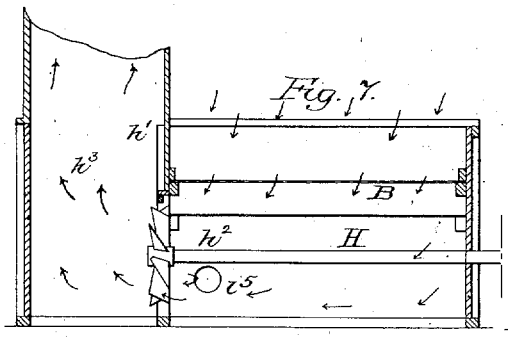
Figure 8:
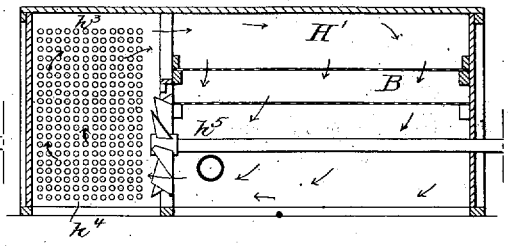
Figure 9:
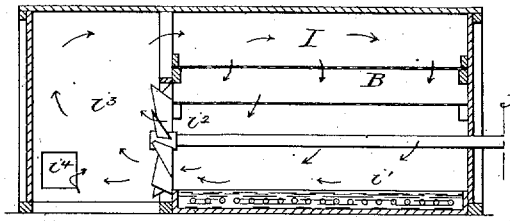
Figure 10:
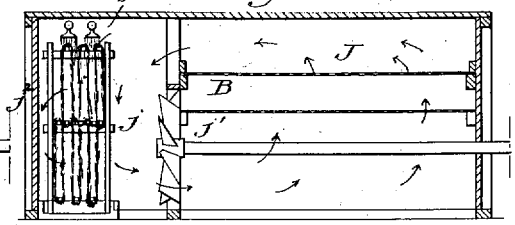

Figures $1^a$ and $1^b$ constitute a longitudinal sectional view of my improved apparatus. Figs. $2^a$ and $2^b$ constitute a sectional plan view. Fig. 3 is a transverse section on the line 3 3, Fig. $1^a$. Fig. 4 is a transverse section on the line 4 4, Fig. $1^a$. Fig. 5 is a transverse section on the line 5 5, Fig. $1^a$. Fig. 6 is a transverse section on the line 6 6, Fig. $1^a$. Fig. 7 is a transverse section on the line 7 7, Fig. $1^b$. Fig. 8 is a transverse section on the line 8 8, Fig. $1^b$. Fig. 9 is a transverse section on the line 9 9, Fig. $1^b$; and Fig. 10 is a transverse section on the line 10 10, Fig. $1^b$.

Referring to the drawings, A is a casing divided in the present instance into nine compartments.

B is an endless carrier in the form of a perforated belt adapted to carry the tobacco to be treated, which belt passes around drums $b$ $b'$ at each end of the machine. At the front end of the machine the belt projects sufficiently beyond the casing to form a feed-table to enable the operator to properly place the tobacco on the belt.

The casing is divided into compartments by a series of transverse vertical partitions $a$, openings being formed in each partition for the passage of the carrying-belt. In some of the partitions are vertical passages, to be particularly described hereinafter, through which air can be drawn from one compartment to another. Each compartment is divided by a longitudinal vertical partition at one side of the belt, and in each compartment, below the belt, is a circulating-fan. The longitudinal partitions do not extend to the full height of the machine, thus forming a communicating passage between the two portions of each compartment, so that when the circulating-fans are in operation the air is drawn down through the tobacco by the fan, forced into the side compartment, up over the tobacco, and again through it, whereby the circulation of air is complete in each compartment.

I will describe the construction of the apparatus and the action of the air in each compartment separately, commencing at the forward end of the machine.

Referring now to Fig. 3, C is the first compartment through which the tobacco travels. In this compartment the tobacco receives a bath of steam-vapor through the medium of the air in violent circulation, so as to thoroughly open the pores of the leaf and get the sap and juices into a very hot state. $c'$ is the longitudinal vertical partition. $c^2$ is a power-driven fan adapted to draw air down through the belt B, having the tobacco thereon, and circulating it again through the compartment $c^3$ and over the belt, as shown by the arrows. $c^5$ is a steam-pipe through which steam escapes into the compartment under the belt, so that the air as it comes from the tobacco is softened by the moisture which is carried through the fan and through the tobacco on the belt. The travel of the belt is so timed as to allow for the thorough treatment of the tobacco to open the pores of the leaf.

Referring now to Fig. 4, the compartment D is divided by a longitudinal vertical partition $d$ into two chambers or compartments communicating at the top. The partition $d$ is provided with one or more circulating-fans $d'$, and in the side compartment $d^2$ is a series of steam-pipes $d^3$, into contact with which the air passes as it circulates through said compartment. The said steam-pipes bring the temperature of the air in the compartment up to about 200°. In this compartment is the greatest heat, so that as soon as the tobacco is thoroughly moistened in the compartment C it is transferred to the compartment D, in which the highly-heated air is in circulation, and this heated air forces off the objectionable matter at first, while the tobacco is in the warm damp state, as it cannot then be scorched by the heat. In the top of this compartment is an opening D′, in which is an exhaust-fan $d^4$. This fan exhausts a certain amount of the air from the compartment, carrying off objectionable matter. The tobacco after it travels through the compartment D passes into the compartment E, Fig. 5. This is similar to the compartment D, having the longitudinal vertical partition $e$, circulating-fans $e'$, and steam-pipes $e^2$. There are not so many steam-pipes in this compartment as in the compartment D, and the temperature is kept at about 175°, thus greatly cooling the tobacco as it passes through this compartment.

The compartments C and E communicate with the compartment D at $c^4$ $e^4$, so that the exhaust fan or fans of the compartment D will carry off the surplus moisture from the compartment C and moisture and objectionable matter from the compartment E.

The compartment F, divided by a longitudinal vertical partition $f$, Fig. 6, through which the tobacco passes from the compartment E, is identical with the compartment E with the exception that the steam-pipes $f^2$ are of a less number than the pipes in the compartment E, and the temperature in this compartment is kept at about 150°, and hence when the tobacco passes out of this compartment any desired portion of the nicotine has been removed, as well as all the water from the leaf.

Sufficient air is admitted to the compartment F through the opening $f'$, Figs. $2^a$ and 6, on the suction side of the fan. It will be noticed that the compartments D and E are closed against the admission of outside air, and air must be drawn through the compartment F, where it is heated up to 150°. A passage $f^4$ communicates with the pressure side of the fan in the compartment F to the suction side of the fans in compartment E, so that there is a positive passage of air from the compartment F to the compartment E. The air in this compartment is heated to 175° and then passes from the pressure side of this compartment to the suction side of the compartment D through a passage $e^4$, where it is heated to about 200°, and from this compartment it is drawn off by the exhaust-fan in the outlet-opening D′. Sufficient air is admitted in the first compartment through the openings for the belt and tobacco, so that no special opening is made in this compartment. An exhaust-opening $c^4$, however, is made from the pressure side of the fan in the compartment C to the suction side of the fan in the compartment D, so that excess of air will pass into the compartment D from the compartment C. The tobacco passes from the compartment F to the compartment G, and this compartment G is a steaming or softening compartment and is similar in every respect to the compartment C. (Shown in Fig. 3.) In the longitudinal vertical partition $g'$ is a circulating-fan $g^2$, and $g^4$ is a steam-inlet pipe in the present instance, and $g^3$ is the side chamber through which the air circulates. The tobacco passes into this compartment from the last drying-compartment and is softened while yet warm, thereby toughening and dampening the leaf before it reaches the cooling-compartment, thus putting it into condition to be more easily cooled in the cooling-compartment, while it at the same time retains some of its toughness and moisture, which prepares it to be more easily ordered in the ordering-compartment. To relieve the pressure in the compartment G, I form an opening $g^5$ in the transverse partition, so that the excess of air can escape from the compartment G to the compartment H. The next requirement is to thoroughly air and then cool the tobacco to a point where it will take "order" properly. The tobacco passes from the compartment G to the fresh-air cooling-chamber. (Shown in Fig. 7.) The main body of the chamber above the belt is open to the atmosphere, and the side compartment $h$ communicates with an exhaust-flue $h'$, so that when the circulating-fan $h^2$ is set in motion it draws the fresh air through the tobacco on the belt into the side compartment $h$ and forces it out through the exhaust-flue $h'$, and in order to still further cool the tobacco to a point where it will take order properly it is passed through the artificial-cooling compartment H′, Fig. $2^b$, in the side chamber $h^3$, in which is a series of cooling-pipes $h^4$. The circulating-fan $h^5$ draws the air down through the tobacco and forces it through the side chamber $h^3$ in contact with the cooling-pipes and over and through the tobacco. The two compartments H and H′ may be made much shorter than the other chambers, as the tobacco will cool very rapidly.

I, Fig. 9, is the first ordering-chamber, in which damp air circulates at about 125°. The pores of the leaf are thereby again opened and take in the moisture. In the bottom of the compartment I is a pan $i'$, containing water, which is heated in the present instance by steam-coils $i'$, so that as the circulating-fans $i^2$ are placed in motion the air will be drawn down through the tobacco and over the surface of the heated water in the pan and forced into the side compartment $i^3$ and over and through the tobacco, thus giving to the tobacco the desired moisture. The tobacco then passes into the compartment J, Fig. 10, where the ordering is finished. The circulating-fan $j'$ is driven in such a manner as to cause the air to circulate up through the tobacco and down through the side chamber, and in this side chamber is arranged a rack $j^2$, on which is placed material capable of retaining moisture, and above this rack are water-spray pipes $j^3$, which spray water upon the absorbing material, so that when the air passes through this absorbent material it will take up moisture and convey it to the tobacco on the endless belt. This moist air is cool and tends to close the pores of the tobacco, leaving it in condition to retain the moisture it has taken up in the first step of ordering. The tobacco leaves the apparatus at this point in condition to prize or pack away in bulk, having passed through nine distinct changes in the apparatus.

To equalize the air-pressure and increase the saturation in compartment I, an opening $i^4$ is made in the partition between the compartments I and J, and a tube $i^5$ forms a communication between chamber I and the chamber H, which serves to reduce pressure in chamber H.

The construction of the apparatus is such that the several actions on the tobacco are controllable to vary the character of the work being accomplished—that is to say, more or less of the nicotine substance may be removed in the steam-vapor bath. The curing and drying may be more or less intense. The softening, toughening, airing out, and cooling can be made to take from the tobacco more or less of the aroma. The ordering can be done to leave ten per cent. of moisture in the leaf for export or the largest percentage required for domestic use—say from twenty to thirty per cent.

Tobacco treated as described is very much improved in quality and the color of bright tobacco preserved, thus materially enhancing the value of all tobaccos, while the cost of curing is greatly decreased.

I claim as my invention—

1. In an apparatus for treating tobacco, the combination of a sweating-compartment, through which the tobacco is first caused to travel, one or more drying-compartments, located next to said sweating-compartment, a cooling-compartment and an ordering-compartment, an endless carrier passing first through the sweating-compartment and then through the other compartments in the order specified, a circulating-fan in each compartment, means for subjecting the tobacco to a vapor-bath in the sweating-compartment, means for heating the air in the drying compartment or compartments, and means for dampening the air in the ordering-compartment, substantially as described.

2. In an apparatus for treating tobacco, the combination of a sweating-compartment, through which the tobacco is first caused to travel, one or more drying-compartments next to said sweating-compartment, a cooling-compartment, an ordering-compartment, an endless carrier passing through the several compartments in the order named, a circulating-fan in each compartment, a steam-pipe opening into the sweating-compartment so as to subject the tobacco to a vapor-bath therein, heating-pipes in the several heating-compartments, and means for dampening the air in the ordering-compartment, substantially as described.

3. The combination of a sweating-compartment, through which the tobacco is first caused to travel, a series of drying-compartments next to said sweating-compartment, a cooling-compartment and an ordering-compartment, an endless carrier passing through the several compartments, means for circulating the air in the several compartments, means for subjecting the material to a vapor-bath in the sweating-compartment, and means for heating the air to a high temperature in the first heating-compartment, means for heating the air at a reduced temperature in the other heating-compartments, and means for dampening the air in the ordering-compartment, substantially as described.

4. The combination of a sweating-compartment, through which the tobacco is first caused to travel, a series of drying-compartments, a cooling-compartment, and an ordering-compartment, said compartments being arranged in the order named, an endless carrier passing through the several compartments, means for circulating the air in the compartments, means for subjecting the material to a vapor-bath in the sweating-compartment, means for heating the air to a high temperature in the first drying-compartment, means for heating the air to a reduced temperature in the other drying-compartments, means for dampening the air in the ordering-compartment, and means for exhausting the air from one or more of the compartments, substantially as described.

5. In an apparatus for treating tobacco, the combination of a sweating-compartment, through which the tobacco is first caused to travel, one or more drying-compartments, a cooling-compartment, an ordering-compartment, an endless carrier passing through the several compartments, a circulating-fan in each compartment, means for subjecting the tobacco to a vapor-bath in the sweating-compartment, and means for heating the air in the drying-compartments, the sweating and drying compartments being provided with a passage connecting the two said compartments, and means for exhausting the air from one or more of said compartments, substantially as described.

6. In an apparatus for treating tobacco, one or more drying-compartments, a cooling-compartment and two ordering-compartments, said compartments being arranged in the order named, an endless carrier passing through the several compartments, a circulating-fan in each compartment, means for heating the air in the heating-compartments, means for subjecting the tobacco to a warm vapor-bath in the first ordering-compartment, and means for subjecting the tobacco to a cool vapor in the second ordering-compartment, substantially as described.

7. In an apparatus for treating tobacco, the combination of a sweating-compartment through which the tobacco is first caused to travel, one or more drying-compartments located next to said sweating-compartment, a second sweating-compartment located next after the drying-compartment, one or more cooling-compartments, and one or more ordering-compartments, said compartments being all arranged in the order named, an endless carrier passing through the several compartments, means for subjecting the tobacco to a vapor-bath in the sweating-compartments, means for heating the air in the drying-compartments and means for moistening the air in the ordering compartment or compartments, substantially as described.

8. In an apparatus for treating tobacco, the combination of one or more drying-compartments, one or more cooling-compartments and a sweating-compartment situated between the drying and cooling compartments through which sweating-compartment the tobacco passes before reaching the cooling compartment or compartments, one or more ordering-compartments, an endless carrier passing through the several compartments, and means for subjecting the tobacco to a vapor-bath in the sweating-compartment, means for heating the air in the drying compartment or compartments, and means for moistening the air in the ordering compartment or compartments, substantially as described.

9. In an apparatus for treating tobacco, the combination of one or more drying-compartments, a sweating-compartment arranged next to and in advance of said drying-compartment, one or more cooling-compartments, a sweating-compartment between the drying and the cooling compartments, one or more ordering-compartments, an endless carrier passing through the several compartments, a circulating-fan in each compartment, means for subjecting the tobacco to a vapor-bath in the sweating-compartments, means for heating the air in the drying-compartments, means for subjecting the tobacco to a warm vapor-bath in the first ordering-compartment, and means for subjecting the tobacco to a cool vapor-bath in the second ordering-compartment, substantially as specified.

10. In apparatus for treating tobacco, the combination of a sweating-compartment, through which the tobacco is first caused to travel, drying-compartments next to said sweating-compartment, a resweating-compartment, one or more cooling-compartments, and one or more ordering-compartments, all arranged in the order named, circulating-fans in each compartment, an endless carrier passing through the several compartments, means for subjecting the tobacco to a vapor-bath in the two sweating-compartments, means for heating the air in the several drying-compartments, means for subjecting the tobacco to damp air in the ordering-compartment, means for exhausting air from one or more of the compartments, substantially as described.

11. In an apparatus for treating tobacco, the combination of a sweating-compartment, through which the tobacco is first caused to pass, three drying-compartments, a resweating-compartment, two cooling-compartments, and two ordering-compartments, all arranged in the order named, means for circulating the air in the several compartments, an endless carrier passing through the several compartments, means for subjecting the tobacco to a vapor-bath in the two sweating-compartments, means for heating the air in the three drying-compartments at different temperatures, means for artificially cooling the air in one of the cooling-compartments, means for subjecting the tobacco to damp air in the two ordering-compartments, means for admitting air into one of the drying-compartments and a passage whereby said air can pass into one of the other drying-compartments, the whole arranged substantially as and for the purpose described.

In testimony whereof I have signed my name to this specification in the presence of two subscribing witnesses.

JOSIAH K. PROCTOR.

Witnesses:
FRANK ROUNTREE,
J. B. HARRISS.